US012637971B2

(12) United States Patent
Hufnagel et al.

(10) Patent No.: US 12,637,971 B2
(45) Date of Patent: May 26, 2026

(54) AIR INTAKE HEATER TREATMENT AND VENTILATION

(71) Applicant: STEWART & STEVENSON LLC, Houston, TX (US)

(72) Inventors: Kevin Hufnagel, Oklahoma City, OK (US); Jeff Rother, Oklahoma City, OK (US)

(73) Assignee: STEWART & STEVENSON LLC, Houston, TX (US)

( * ) Notice: Subject to any disclaimer, the term of this patent is extended or adjusted under 35 U.S.C. 154(b) by 3 days.

(21) Appl. No.: 18/213,009

(22) Filed: Jun. 22, 2023

(65) Prior Publication Data

US 2024/0003287 A1 Jan. 4, 2024

Related U.S. Application Data

(60) Provisional application No. 63/357,220, filed on Jun. 30, 2022.

(51) Int. Cl.

| | |
|---|---|
| ***F01P 7/12*** | (2006.01) |
| ***F01P 3/20*** | (2006.01) |
| ***F01P 7/02*** | (2006.01) |
| ***F01P 7/14*** | (2006.01) |
| ***F01P 11/12*** | (2006.01) |
| ***F02B 63/04*** | (2006.01) |

(52) U.S. Cl.
CPC *F01P 7/12* (2013.01); *F01P 3/20* (2013.01); *F01P 7/026* (2013.01); *F01P 7/14* (2013.01); *F01P 11/12* (2013.01); *F02B 63/047* (2013.01); *F01P 2025/08* (2013.01); *F01P 2060/185* (2013.01)

(58) Field of Classification Search
CPC ...... F01P 7/12; F01P 3/20; F01P 7/026; F01P 7/14; F01P 11/12; F02B 63/047
USPC .......................................................... 123/41.01
See application file for complete search history.

(56) References Cited

FOREIGN PATENT DOCUMENTS

WO WO-2018050408 A1 * 3/2018 ............... F02G 5/04

* cited by examiner

*Primary Examiner* — Lindsay M Low
*Assistant Examiner* — Omar Morales
(74) *Attorney, Agent, or Firm* — Ewing & Jones, PLLC

(57) ABSTRACT

A generator system comprising a generator and an engine positioned within an enclosure, the engine having an engine coolant system and an air intake; a fan positioned to force air through the heater core; a low temperature fluid circuit comprising a heater core positioned within the enclosure, a first coolant heater in fluid communication with the heater core, and a first pump in fluid communication with the first coolant heater and configured to pump heated coolant from the first coolant heater to the heater core; and a high temperature fluid circuit comprising a radiator, second coolant heater, and a second pump in fluid communication with the second coolant heater and configured to pump heated coolant from the second coolant heater through the high temperature fluid circuit, wherein the low temperature fluid circuit and the high temperature fluid circuit are each in fluid communication with the coolant system of the engine.

12 Claims, 5 Drawing Sheets

AIR INTAKE HEATER TREATMENT AND VENTILATION

CROSS-REFERENCE TO RELATED APPLICATIONS

This application is a nonprovisional application which claims priority from U.S. provisional application No. 63/357,220, filed Jun. 30, 2022, which is incorporated by reference herein in its entirety.

TECHNICAL FIELD/FIELD OF THE DISCLOSURE

The present disclosure relates generally to generator systems, and specifically to air handling systems for generator systems.

BACKGROUND OF THE DISCLOSURE

Mobile generator systems may be used to provide power in remote environments. Mobile generator systems typically use internal combustion engines as prime movers. These engines typically are limited in their output based on the ambient conditions including ambient air temperature. For example, when the ambient temperature is outside of an operational temperature range, the engine output may be derated such that output power is reduced. At extreme temperatures, the generator may be shut down entirely to avoid damaging the engine.

SUMMARY

The present disclosure provides for a generator system. The generator system may include a generator and engine positioned within an enclosure. The generator system may include a heater core, the heater core positioned within the enclosure. The generator system may include a fan positioned to force air through the heater core into the enclosure. The generator system may include a coolant heater. The generator system may include a pump, the pump operatively coupled to the coolant heater and the heater core positioned to pump heated coolant from the coolant heater to the heater core.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
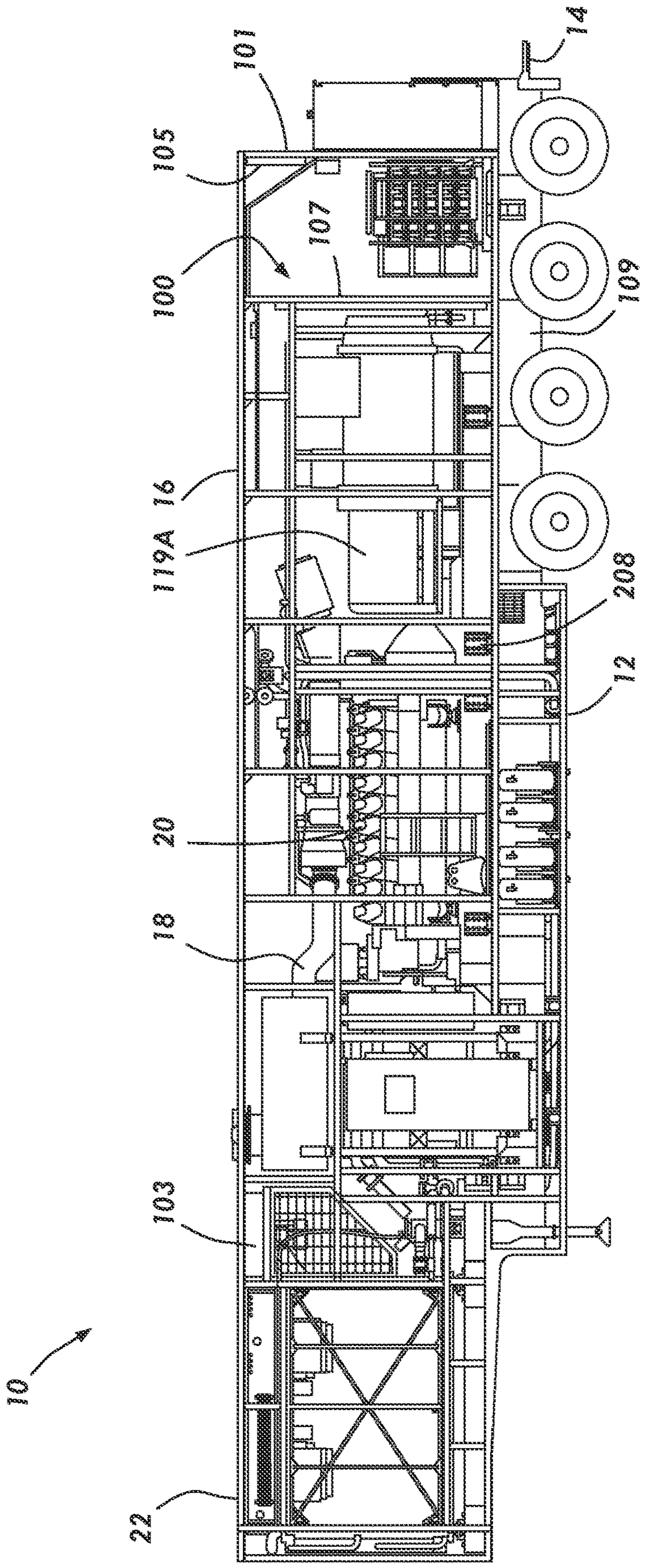
FIG. 1 depicts a cutaway side view of a generator system including an air intake heater treatment system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
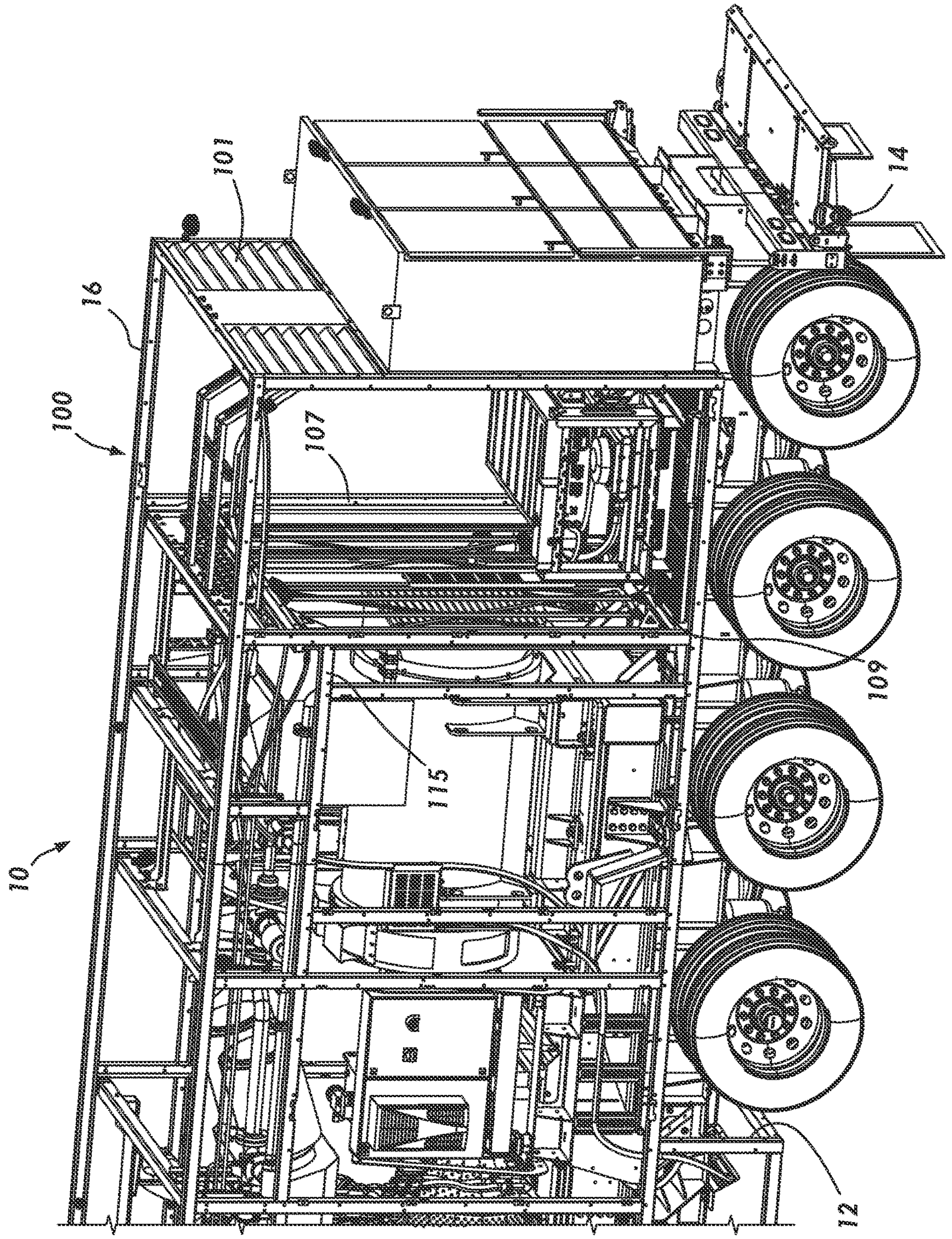
FIG. 2 is a partial cutaway perspective view of the generator system of FIG. 1.

FIGS. 1 and 2 depict a generator system 10. Generator system 10 may be adapted to be a portable system. In some such embodiments, generator system 10 may include skid 12, which may be part of a trailer 14. Generator system 10 may include enclosure 16 positioned on skid 12 which may house components of generator system 10.

In some embodiments, generator system 10 may include a generator 18, which may be powered by an engine 20. Generator 18 and engine 20 may be positioned within an enclosure 16. Generator system 10 may also include power handling equipment. In some embodiments, generator system 10 may include a radiator system 22 positioned to, for example and without limitation, provide cooling when necessary for a coolant system of generator system 10 as further discussed herein below.

In some embodiments, generator system 10 may include an air intake heater treatment system 100. Air intake heater treatment system 100 may include components mounted to skid 12 and positioned within enclosure 16.

Figure 3:
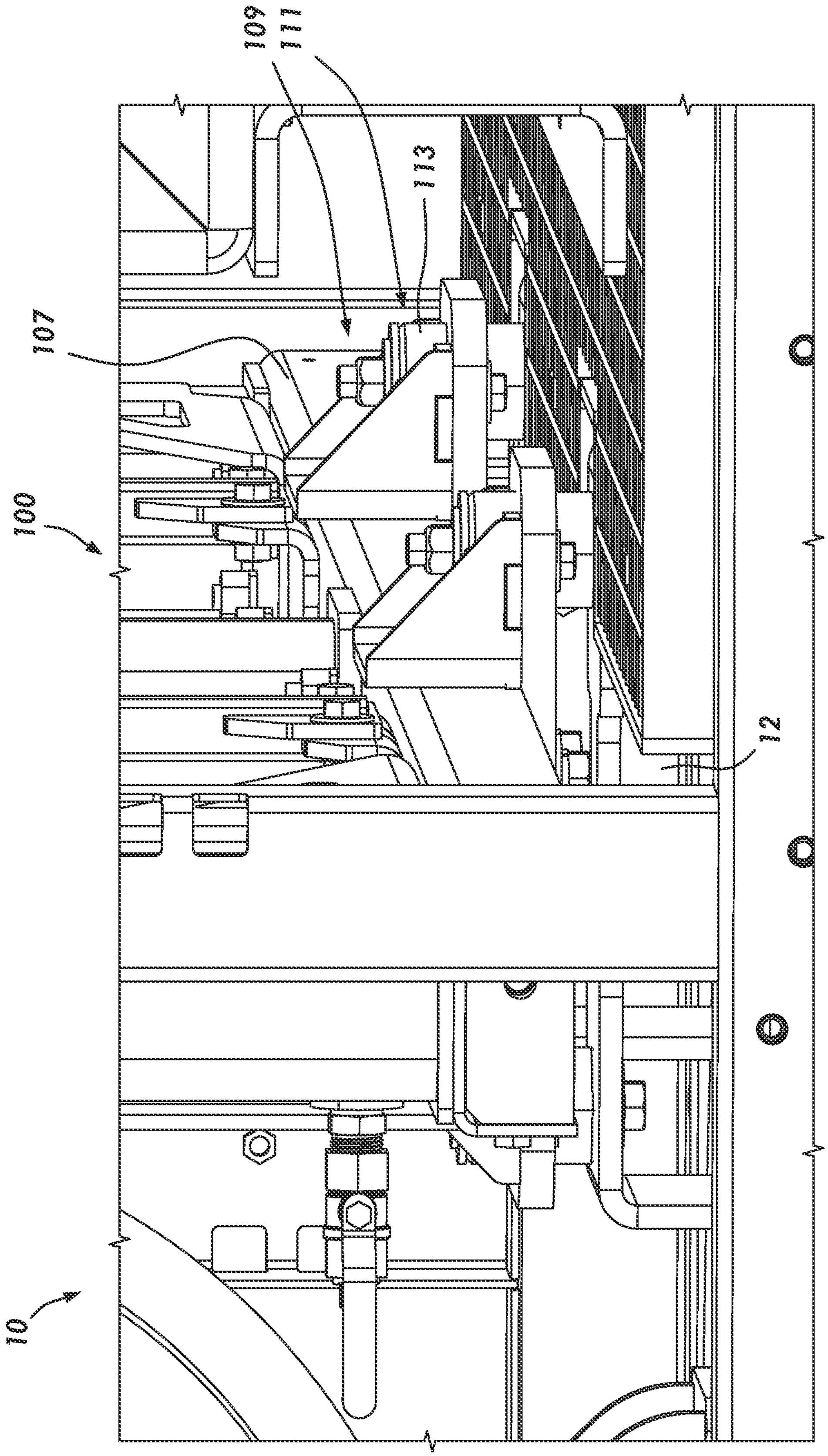
FIG. 3 is a side view of a lower mount of a heat exchanger of an air intake heater treatment system consistent with at least one embodiment of the present disclosure.

Referring now to FIG. 3, in some embodiments, heater core 107 may couple to skid 12 or enclosure 16 by one or more bottom brackets 109 in a manner that allows relative movement between heater core 107 and the equipment on which it is supported. In some embodiments, bottom brackets 109 may form cradles positioned to support heater core 107. In some embodiments, bottom brackets 109 may couple between heater core 107 and skid 12 while mechanically isolating heater core 107 from skid 12. In some embodiments, bottom brackets 109 may include one or more isolation features 111 such as, for example and without limitation, spring isolators or anti-vibration pads 113, which may be formed from an elastomeric material to, without being bound to theory, isolate heater core 107 from vibrations and other forces that may be encountered by generator system 10 during transportation or operation of generator 18 and engine 20.

Figure 4:
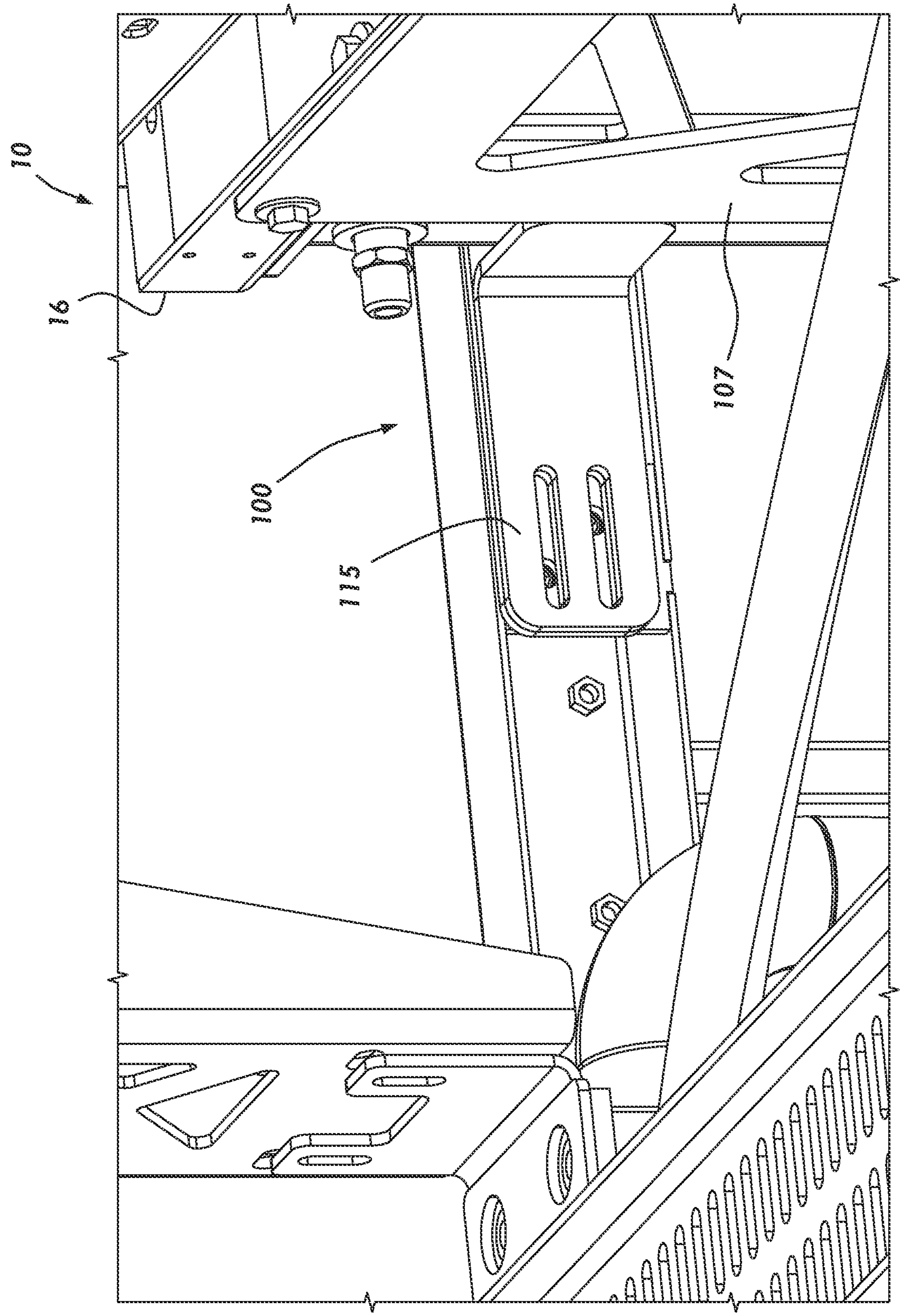
FIG. 4 is a side view of an upper mount of a heat exchanger of an air intake heater treatment system consistent with at least one embodiment of the present disclosure.

As shown in FIG. 4, one or more top brackets 115 may couple heater core 107 to enclosure 16. In some embodiments, top brackets 115 may form cradles positioned to support heater core 107 without directly coupling to heater core 107.

In some embodiments, top brackets 115 may operate in conjunction with bottom brackets 109 to allow a predetermined, relatively small, amount of relative movement along all three axes (in three dimensions) between heater core 107 and skid 12, so as to protect heater core 107 from vibrations and shocks during transportation of generator system 10. By insulating heater core 107 from vibration and shock and allowing it to move independently, the risk of a coolant leak is reduced.

In some embodiments, air intake heater treatment system 100 may be used to heat the interior of enclosure 16 to within an operational temperature range for the operation of engine 20. Air may be drawn into enclosure 16 through louvers 101 (shown in FIG. 2) that may be positioned at the end or on the sides of enclosure 16 by fans 103 positioned at the opposite end of enclosure 16. Louvers 101 may be fixed or adjustable. In some embodiments, louvers 101 may be adjustable manually or may be controlled by a controller as further described below. In some embodiments, louvers 101 may be sound-attenuated. In some embodiments, louvers 101 may be positioned toward the rear end of generator system 10. As the air enters enclosure 16, the air may pass through one or more filter media 105 to, for example and without limitation, remove particulate matter and other contamination. Filter media 105 may be adjacent to louvers 101 or may be positioned at another suitable position for filtering the air inflow.

Air entering enclosure 16 via louvers 101 may flow through at least one heater core 107. Heater core 107 may be mounted within enclosure 16 such that air passing through enclosure 16 passes through heater core 107. Heater core 107 may be mounted vertically, horizontally, or at an angle. In some embodiments, heater core 107 may include one or more coolant tubes configured such that heated coolant passed through heater core 107 heats the air passing through heater core 107. In some embodiments, for example and without limitation, the coolant tubes may be formed from copper or another material having similar physical characteristics.

Figure 5:
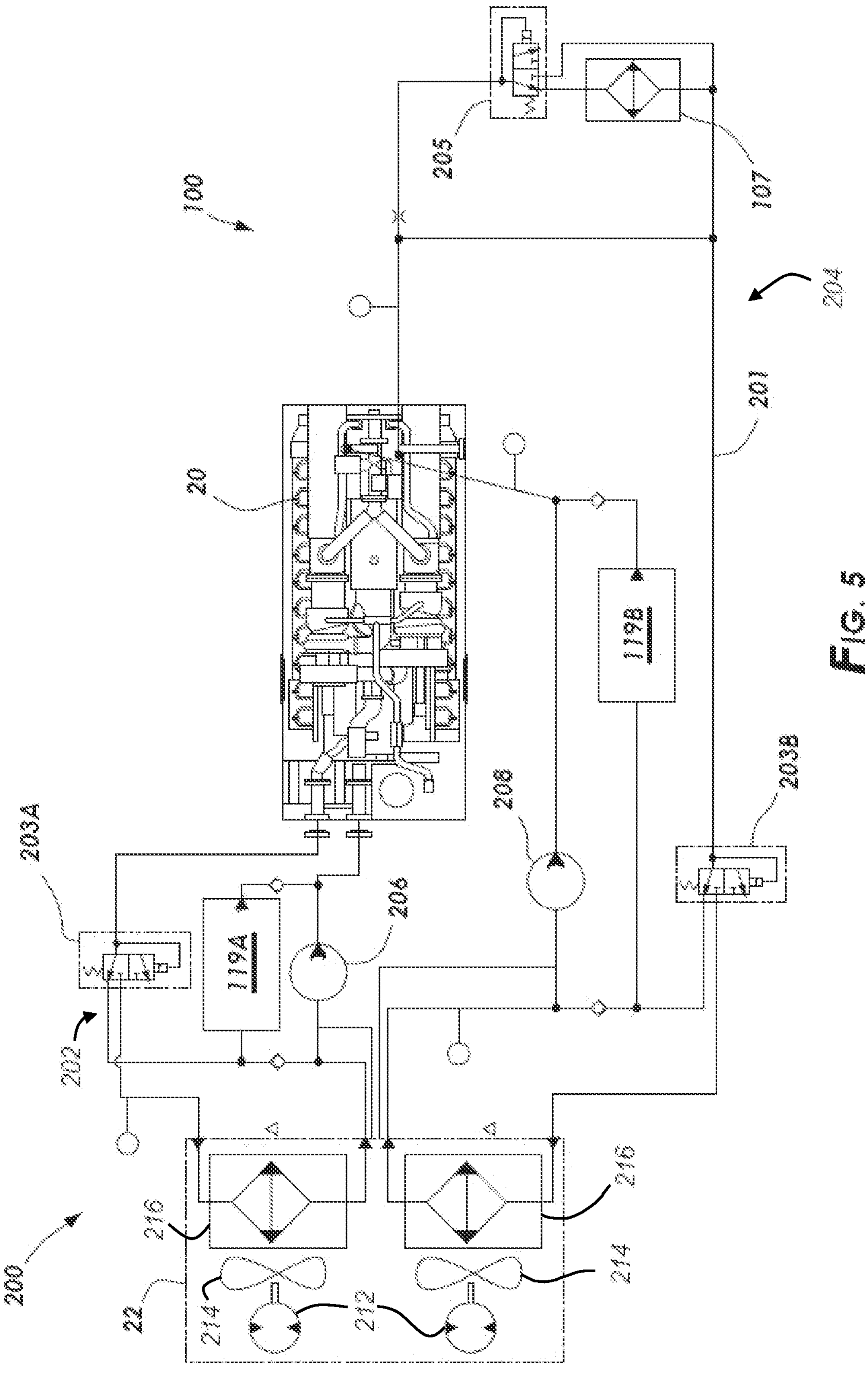
FIG. 5 is a schematic view of an air intake heater treatment system consistent with at least one embodiment of the present disclosure.

After passing through heater core 107, the heated air continues further into enclosure 16 such that the heated air flows around engine 20. If the temperature of the heated air is greater than the temperature of engine 20 the heated air will transfer heat to engine 20 so as to preheat or maintain the temperature of engine 20 within a desired temperature range. As air inside enclosure 16 may also serve as intake air for engine 20, heat may be transferred to engine via the air intake in addition to air surrounding the engine Referring to FIG. 5, in some embodiments, a coolant system 200 for generator system 10 may include a high temperature circuit (HTC) 202 and a low temperature circuit (LTC) 204. HTC 202 and LTC 204 may each comprise a closed circuit in which a fluid, which may be coolant fluid, circulates so as to transfer heat from a heater to another part of generator system 10.

HTC 202 may include a radiator system 22, which in turn may include at least one motor 212, which drives at least one radiator fan 214, and at least one radiator 216. Motor 212 drives radiator fan 214, which blows air across radiator 216. HTC 202 may further include a pump 206, a coolant heater 119A, and a radiator valve 203A and may optionally be fluidly connected to engine 20 so as to pump fluid therethrough. In this way, HTC 202 may be used to warm fluid (water) in the engine jacket and thus the engine itself prior to startup.

LTC 204 may include a radiator valve 203B, pump 208, coolant heater 119B, heater core 107, and heater core valve 205, which may be fluidly connected by coolant lines 201. Fluid flow through LTC 204 may be controlled by radiator valves 203B and heater core valve 205. In some embodiments, LTC 204 may also be in fluid communication with engine 20. In these embodiments, fluid flowing through LTC 204 is used to warm the engine pre startup in addition to providing the heat to the coolant that is then extracted through the heater core to warm the enclosure.

In some embodiments, pump 208 and pump 206 may be replaced with a single pump that is in fluid communication with both HTC 202 and LTC 204; in such an embodiment, flow through the various portions of coolant system 200 may be controlled by valves 203A, 203B, and pump 206. Additional valves may be included in the system as desired.

When it is necessary to remove heat from engine 20 instead of warming it, coolant heaters 119A and 119B may be switched off and radiator system 22 may function to transfer heat from generator system 10 to the atmosphere by passing ambient air across radiators 216.

In some embodiments, HTC 202 and LTC 204 may be in fluid communication with each other or may share components. For example, in the embodiment shown in FIG. 5, fluid can pass from HTC 202 to LTC 204 or vice versa and either part of coolant system 200 may be used both for thermal regulation of engine 20 and to provide heated fluid to heater core 107. In some embodiments, one coolant heater 119A or 119B could be eliminated and all pre-start warmup heat could be provided by the other coolant heater. In each instance, radiator valves 203A and 203B and heater core valve 205 may be used to control the flow of fluid through coolant system 200. Likewise, air flow within coolant system 200 could be configured so that fans 214 pull air into enclosure 16.

In some embodiments, valves 203A, 203B, and heater core valve 205 may be controlled by a controller. In some embodiments, the controller may be the same controller that operates generator 18 and engine 20. In other embodiments, the controller may be separate from the controller that operates generator 18 and engine 20. In some embodiments, the controller may also control the operation of one or more of louvers 101, fans 103, fans 214, coolant heaters 119A, 119B, and radiator system 22.

Each coolant heater 119A, 119B may comprise a burner fueled with natural gas, diesel, or other fuel or may be electrically powered. By way of example, coolant heater, 119B, may be a 55K BTU unit. In other embodiments, an electrically powered coolant heater may be integral with a heater core. Each coolant heater 119A, 119B may include a integral pump, which may be used to pump fluid through HTC 202 and LTC 204, respectively.

When it is desired to operate generator system 10, the controller may determine the ambient temperature measured as the engine temperature, the temperature within enclosure 16, the intake air temperature of enclosure 16, or a combination thereof. Where the ambient temperature is within a predetermined operational temperature range for generator system 10, engine 20 may be started up without any preliminary steps. The controller may then operate fans 214, pump 206, and radiator system 22 as normal to maintain the desired operational temperature of engine 20 during operation thereof.

If the controller determines that the ambient temperature is below the predetermined operational temperature range, the controller may activate either HTC 202, LTC 204, or both. Thus, one or both coolant heaters 119A, 119B are turned on. One or both pumps 206, 208 may optionally be turned on. Heater core valve 205 may be opened such that heated coolant is provided to heater core 107. If desired, radiator valves 203A, 203B may be opened. Fans 103 may be turned on, such that air is pulled into enclosure 16 through heater core 107 and heated air flows across engine 20. In some embodiments, pumps 206, 208 may supply heated coolant fluid to engine 20 such that the coolant also provides heating to engine 20. In this manner, engine 20 may be brought to an operational temperature more quickly. Once the ambient temperature is within the predetermined operational temperature range, engine 20 may be engaged. Selection of whether to operate both coolant heaters or just one may depend on the rate at which it is desired to bring the engine to the target temperature.

The controller may then be used to maintain the operational temperature range. For example, at some point during the operation of generator system 10, the heat from engine 20 may be sufficient to heat the interior of enclosure 16, prompting the controller to disengage one or both coolant heaters 119A, 119B, pump 208, and fans 103. In some embodiments, pump 206 and fan 214 remain in operation, allowing the HTC 202 to dissipate heat generated by the engine via radiator 216.

Although described as a single heater core 107, in some embodiments, multiple heater cores 107 may be positioned within enclosure 16. In some embodiments, heater core 107 may fully engage the top, bottom, and sides of enclosure 16. In other embodiments, heater core 107 may be smaller. Although fans 103 are described as pulling air through heater core 107, in other embodiments, fans 103 may be positioned to push air through heater core 107.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. A generator system comprising:

a generator and engine positioned within an enclosure, wherein the engine has an engine coolant system and is configured to take in air from within the enclosure;

a low temperature fluid circuit comprising:

a heater core, the heater core positioned within the enclosure;

a first coolant heater in fluid communication with the heater core; and a first pump, the first pump in fluid communication with the first coolant heater and configured to pump heated coolant from the coolant heater to the heater core;

a fan positioned to force air through the heater core;

a high temperature fluid circuit, the high temperature fluid circuit comprising:

a radiator;

a second coolant heater; and a second pump, the second pump in fluid communication with the second coolant heater and configured to pump heated coolant through the high temperature fluid circuit; and one or more bottom brackets, wherein the bottom brackets form a cradle configured to support the heater core while allowing movement of the heater core in three dimensions relative to the skid.

2. The generator system of claim 1 wherein the enclosure includes an opening and the opening includes one or more controllable louvers positioned to allow air to be drawn into the enclosure by the fan.

3. The generator system of claim 2, further comprising a filter, wherein the system is configured such that air passing through the louvers must flow through the filter.

4. The generator system of claim 1 wherein the heater core comprises one or more coolant tubes through which the heated coolant may flow to heat air forced through the heater core.

5. The generator system of claim 4 wherein the low temperature fluid circuit is in fluid communication with the coolant system of the engine.

6. The generator system of claim 1, further comprising a skid to which the generator, engine, heater core, and enclosure are mounted.

7. The generator system of claim 6 wherein the skid forms part of a trailer.

8. The generator system of claim 1, further comprising one or more top brackets, the top brackets forming a cradle configured to support the heater core while allowing movement of the heater core relative to the skid.

9. The generator system of claim 1 wherein the coolant heater is fueled with natural gas, diesel, or other fuel, or is electrically powered.

10. The generator system of claim 1 wherein the high temperature fluid circuit is in fluid communication with the engine coolant system.

11. The generator system of claim 1 wherein the high temperature fluid circuit further includes a fan configured to force air across the radiator.

12. The generator system of claim 1, wherein the low temperature fluid circuit and the high temperature fluid circuit are each in fluid communication with the coolant system of the engine.

* * * * *